United States Patent [19]

Shimada

[11] Patent Number: 4,982,977

[45] Date of Patent: Jan. 8, 1991

[54] CAMBER SETTING APPARATUS OF A STRUT TYPE SUSPENSION

[75] Inventor: Hideo Shimada, Tokyo, Japan

[73] Assignee: Fuji Jukogyo Kabushiki Kaisha, Tokyo, Japan

[21] Appl. No.: 464,394

[22] Filed: Jan. 12, 1990

[51] Int. Cl.$^5$ .............................................. B62D 17/00
[52] U.S. Cl. ..................................... 280/661; 403/161; 403/4
[58] Field of Search ..................... 280/661, 688, 673; 403/4, 161, 162, DIG. 8, 408.1, 409.1, 374

[56] References Cited

U.S. PATENT DOCUMENTS

| | | | |
|---|---|---|---|
| 3,917,308 | 11/1975 | Schulz | 280/661 |
| 4,035,093 | 7/1977 | Redshaw | 403/4 |
| 4,194,760 | 3/1980 | Shiomi et al. | 280/661 |
| 4,718,691 | 1/1988 | Specktor et al. | 280/661 |

FOREIGN PATENT DOCUMENTS 3010759 10/1980 Fed. Rep. of Germany ...... 280/661

Primary Examiner—Charles A. Marmor
Assistant Examiner—Karin Tyson
Attorney, Agent, or Firm—Beveridge, DeGrandi & Weilacher

[57] ABSTRACT

An upper end portion of a steering knuckle is fastened to a pair of parallel flanges of a bracket secured to a lower end portion of the strut by a relative angle adjusting mechanism. The upper portion of the steering knuckle is adapted to swing about the pivoting bolt by turning the relative angle adjusting means to adjust a relative angle of the steering knuckle for setting a camber angle. One of the flanges is provided with a first guide opening extending crosswisely with respect to the axis of the strut whereas the other flange includes a second guide opening extending in parallel with the axis of the strut. The relative angle adjusting mechanism is provided with an adjust bolt having a larger diameter portion and a smaller diameter portion. The larger diameter portion is eccentric to the smaller diameter portion for easily adjusting the camber angle.

8 Claims, 2 Drawing Sheets

CAMBER SETTING APPARATUS OF A STRUT TYPE SUSPENSION

BACKGROUND OF THE INVENTION

The present invention relates to a camber setting apparatus of a strut type suspension of a motor vehicle.

As a suspension of the motor vehicle, the strut type suspension has been widely used. In the strut type suspension, a strut used as the shock absorber shaft, is connected at its lower end to a steering knuckle through a connecting bracket, the steering knuckle extending from a corresponding wheel hub. In the strut type suspension, the camber angle may not be set to a predetermined value because of assembly errors and can change due to deformation of components thereof. These cause tires to be nonuniformly worn away and deteriorate operability and riding comfort of the vehicle.

To overcome this problem there have been proposed various strut type suspensions capable of adjusting camber angle, for example, in U.S. Pat. No. 3,917,308 and Japanese Utility Model (examined) Publication No. 60 (1985)-17,409. In each of these strut type suspensions, a camber setting mechanism is connected to the strut and the steering knuckle.

U.S. Pat. No. 3,917,308 discloses a camber setting mechanism, in which a steering knuckle is connected to a U-shaped bracket by vertically spaced adjusting and pivot bolts, and the bracket is secured to a strut. The adjusting bolt has a pair of eccentric discs fitted around the shank thereof. The eccentric discs are fitted in recesses formed in the bracket and the adjusting bolt slidably passes through guide slots which are formed through the bracket in a camber angle adjusting direction. The eccentric discs must be exactly angularly positioned to provide a predetermined camber. When the adjusting bolt is loosened, the eccentric discs freely rotates and hence the upper end of the steering knuckle may be turned about an axis of the pivot bolt, thus causing a change in camber angle.

In Japanese Utility Model (examined) Publication No. 60 (1985)-17,409, the camber setting mechanism also includes vertically spaced adjusting and pivot bolts which pass through both a bracket and an upper end portion of a steering knuckle. The adjusting bolt has an eccentric disk-shaped adjusting piece fitted around it, and the adjusting piece is fitted in a hole of the steering knuckle. The adjusting piece has a lever integrally formed with it, and the adjusting piece is turned about an axis of the adjusting bolt by moving the lever, so that the upper end portion of the steering knuckle is swung about the axis of the pivot bolt for adjusting the camber angle. The camber setting mechanism is rather complicated in structure and is hence costly. Moreover, to adjust the camber angle, the lever must be turned to a position after the adjusting bolt is loosened, and then the bolt must be tightened with the adjusting piece held at the position. The camber adjusting operation is laborious.

SUMMARY OF THE INVENTION

Accordingly, it is an object of the present invention to provide a camber setting apparatus of a strut type suspension. The camber setting apparatus facilitates adjustment of the camber angle with a simple construction as compared to camber setting apparatuses of the prior art.

With this and other objects in view, the present invention provides a camber setting apparatus of a strut type suspension of a vehicle, in which a relative angle of a steering knuckle having an upper portion is adjusted to set a camber angle, and the strut has a lower end portion and an axis. The camber setting apparatus includes: bracket means, secured to the lower end portion of the strut, for connecting the upper end portion of the steering knuckle with the lower end portion of the strut, the bracket means including a pair of parallel flanges projecting outwards from the strut, one of the flanges including a first guide for defining a first guide opening extending crosswisely with respect to the axis of the strut and the other flange having a second guide for defining a second guide opening extending in parallel with the axis of the strut; relative angle adjusting means for adjusting the relative angle of the steering knuckle to the strut, the adjusting means including an adjust bolt having a larger diameter shank portion and a smaller diameter shank portion formed integrally with the larger diameter shank portion, the larger diameter shank portion being larger in diameter than the smaller diameter shank portion and being eccentric to the smaller diameter portion, the larger diameter shank portion slidably passing through the first guide opening and closely passing through the upper portion of the steering knuckle, the upper portion being placed between the flanges, and the smaller diameter portion slidably passing through the second guide opening; and pivoting means, passing through the flanges and the upper portion of the steering knuckle for pivotally fastening the steering knuckle to the flanges, the pivoting means being vertically spaced from the adjusting means, whereby the upper portion of the steering knuckle is swung about the pivoting means by turning the adjusting bolt member to adjust the relative angle of the steering knuckle to the strut to thereby set the camber angle.

BRIEF DESCRIPTION OF THE DRAWINGS

The present invention will now be described by way of example with reference to the drawings, in which.

DETAILED DESCRIPTION OF THE PREFERRED EMBODIMENTS

Figure 1:
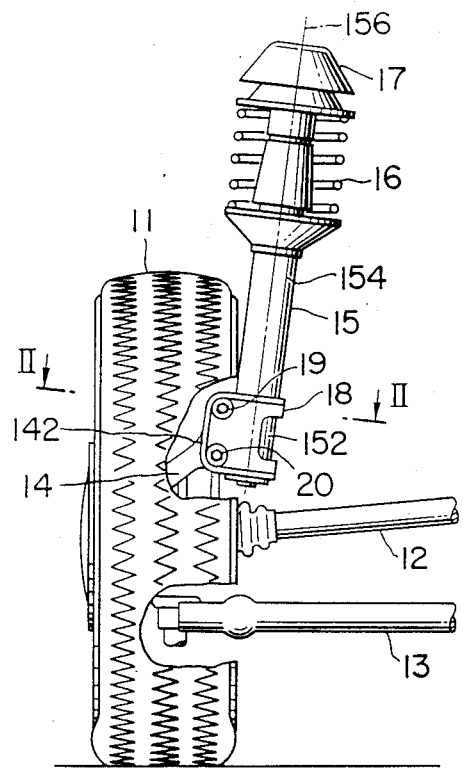
FIG. 1 is a front view of a camber setting apparatus of a strut type suspension according to the present invention.

Referring now to FIG. 1, reference numeral 12 indicates an axle of a wheel 11, 13 a link rod and 14 a steering knuckle which extends from a hub assembly of the wheel 11. The steering knuckle 14 is connected at its upper end 142 to a substantially U-shaped connecting bracket 18 secured to a lower end portion 152 of a strut 15. The strut 15 constitutes a shock absorber shaft of a strut type suspension and is mounted at its upper end portion 154 to a vehicle frame, not shown, through a coil spring 16 and a strut mount 17.

Figure 2:
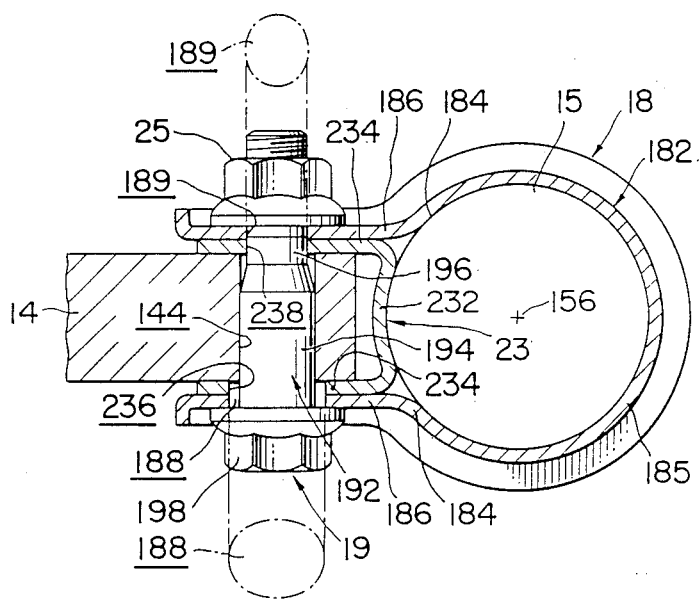
FIG. 2 is an enlarged view taken along the line II—II in FIG. 1, guide slots being also shown by a dot-and-dash line in a front view and a rear view for illustration purpose.

As shown in FIG. 2, the connecting bracket 18 includes an arcuate belt portion 182 secured around the lower end portion 152 of the strut 15. The arcuate belt portion 182 is made up of a pair of body portions 183 and 183 and two vertically spaced belt portions 185 and 185 which bridge between the body portions 183 and 183. One lateral edge 187 of each of the body portions 183 and 183 terminates in a pair of parallel flanges 186 and 186, the lateral edge 187 being remote from the belt portions 185. A channel-shaped reinforcing member 23 is interposed between the flanges 186 and 186 of the connecting bracket 18 and secured at its flange portions 234 and 234. The flange portions 234 and 234 of the reinforcing member 23 extend in parallel with the flanges 186 and 186, and the web portion 232 thereof is placed in contact with the lower end portion 152 of the strut 15 for reinforcing the flanges 186 and 186 of the connecting bracket 18. The upper end 142 of the steering knuckle 14 is slidably placed between the flange portions 234 and 234 and is fastened to the flanges 186 and 186 of the connecting bracket 18 with both a camber adjusting bolt 19 and a pivot bolt 20 arranged below the camber adjusting bolt 19.

The camber adjusting bolt 19 has an eccentric shank portion 192. The shank portion 192 includes a larger diameter portion 194 which terminates in a smaller diameter portion 196. An axis C1 of the larger diameter portion 194 is in parallel with an axis C2 of the smaller diameter portion 196 and is shifted a distance 1.

The flanges 186 and 186 of the connecting bracket 18 are provided with slots 188 and 189 respectively whereas the flange portions 234 and 234 of the reinforcing member 23 slots 236 and 238, respectively. The larger diameter portion 194 of the camber adjusting bolt 19 slidably passes through the slot 188 and guides through slot 236. As shown by a dot-and-dash line in FIG. 2, the slot 188 is formed in a camber adjusting direction (the lateral direction therein) and the slot 236 is formed in the same shape as and registered to the slot 188. Thus, the larger diameter portion 194 of the camber adjusting bolt 19 is guided by the slots 188 and 236 in the camber adjusting direction. The smaller diameter portion 196 of the camber adjusting bolt 19 slidably passes through the slots 189 and 238. The slot 189 is formed in parallel with an axial direction 156 of the strut 15 (in a direction vertical to the plane of the sheet of FIG. 2), so that the smaller diameter portion 196 is guided in that direction. The slot 238 has the same shape as and is registered to the slot 189.

The upper end 142 of the steering knuckle 14 is provided with a hole 144 through which the larger diameter portion 194 rotatably and substantially snugly passes.

Figure 3:
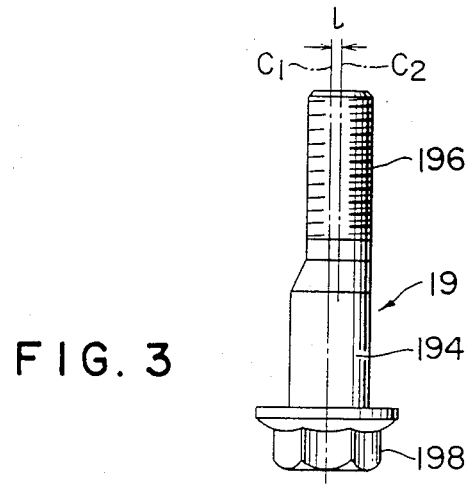
FIG. 3 is a plan view of the adjusting bolt in FIG. 2.
Figure 4:
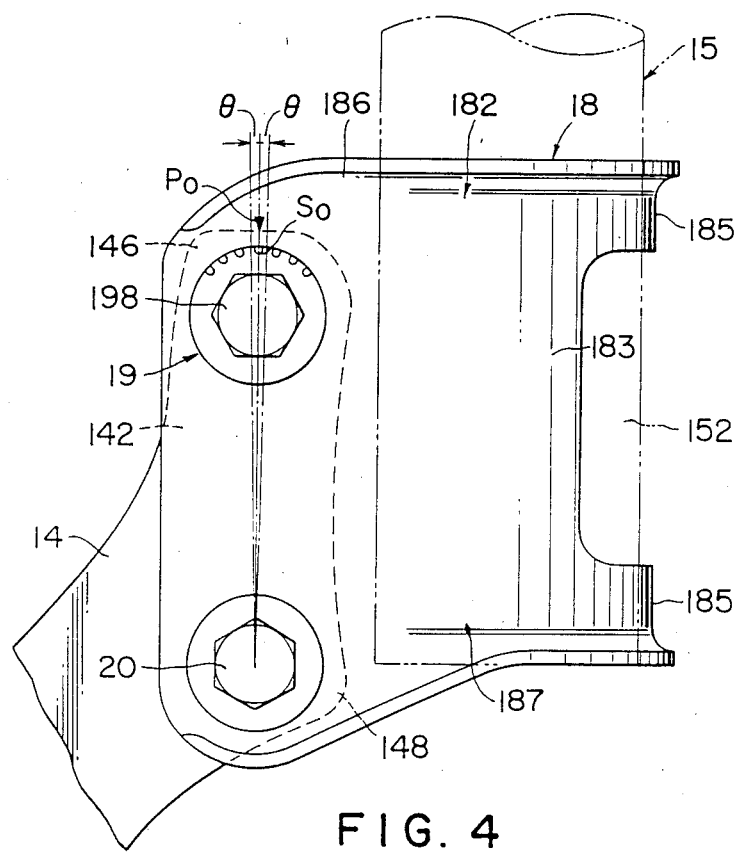
FIG. 4 is an enlarged front view of the camber setting apparatus of FIG. 1.

In connecting the steering knuckle 14 to the connecting bracket 18 secured to the strut 15, the upper end 142 of the steering knuckle 14 is placed between the flange portions 234 and 234 of the reinforcing member 23, and the upper corner 146 thereof is, as clearly shown in FIG. 4, fastened by the camber adjusting bolt 19 and the lower corner 148 by the pivot bolt 20. In this event, the shank 192 of the camber adjusting bolt 19 is passed from the slots 188 and 236 through the hole 144 and thus the smaller diameter portion 196 passes through the slots 189 and 238 and projects outwardly from the slot 189. A flanged nut 25 is threaded to the projecting portion of the smaller diameter portion 196 to tighten the camber adjusting bolt 19. The camber adjusting bolt 19 is designed to provide a predetermined camber angle when it is set to a position where an eccentric direction or the direction indicated by the arrows in FIG. 3 is parallel with the axial direction 156 of the strut 15. To make the setting of the predetermined camber angle with ease, a marking Po as a reference point for the predetermined camber angle is provided to one flange 186 in the vicinity of the head 198 of the camber adjusting bolt 19 whereas the head 198 is provided with a marking as a standard position So which indicates the eccentric direction. The head 198 further has a several markings spaced at regular angular intervals.

When the camber angle changes from a set angle, the pivot bolt 20 and the flanged nut 25 are loosened. In this condition, the head 198 of the camber adjusting bolt 19 is turned by a spanner in a clockwise or counterclockwise direction, and thereby the larger diameter portion 194 of the camber adjusting bolt 19 slides in the slots 188 and 236 in the camber adjusting direction while the smaller diameter portion 196 moves in the slots 189 and 238 in the axial direction 156. Thus, the upper end 142 of the steering knuckle 14 is turned an angle about the center of the pivot bolt 20, so that a relative angle of the steering knuckle 14 to the strut 15 is changed to adjust the camber angle. After completing the adjustment of the camber angle, both the flanged nut 25 and the pivot bolt 20 are tightened to fix the steering knuckle 14 to the connecting bracket 18.

Thus, the camber setting apparatus according to the present invention facilitates adjustment to correct a change of a camber angle set as well as setting of the camber angle, and hence nonuniform wearing of tires can be easily prevented. This improves operability and riding comfort of the vehicle.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A camber setting apparatus of a strut type suspension of a vehicle, wherein a relative angle of a steering knuckle is adjusted to set a camber angle, a strut having a lower end portion and an axis, and the steering knuckle having an upper portion, the improvement which comprises:

a bracket secured to the lower end portion of the strut and connecting the upper end portion of the steering knuckle to the lower end portion of the strut, the bracket including a pair of parallel flanges projecting outwards from the strut, one of the flanges including a first guide for defining a first guide opening extending crosswisely with respect to the axis of the strut and the other flange having a second guide for defining a second guide opening extending in parallel with the axis of the strut;

relative angle adjusting means for adjusting the relative angle of the steering knuckle to the strut, the adjusting means including an adjust bolt having a larger diameter portion and a smaller diameter portion, the larger diameter portion being larger in diameter than the smaller diameter portion and being eccentric to the smaller diameter portion, the larger diameter portion slidably passing through the first guide opening and closely passing through the upper portion of the steering knuckle, the upper portion being placed between the flanges, and the smaller diameter portion slidably passing through the second guide opening; and pivoting means passing through the flanges and the upper portion of the steering knuckle for pivotally fastening the steering knuckle to the flanges, the pivoting means being vertically spaced from the adjusting means, whereby the upper portion of the steering knuckle is swung about an axis of the pivoting means by turning the adjust bolt to adjust the relative angle of the steering knuckle to set the camber angle.

2. The camber setting apparatus according to claim 1, wherein:

the relative angle adjusting means is arranged above the pivoting means; and the relative angle adjusting means comprises a nut threaded to the adjust bolt for securing the adjust bolt to the flanges.

3. The camber setting apparatus according to claim 1, wherein the bracket comprises an arcuate belt portion mounted around the lower portion of the strut, the arcuate belt portion having opposite end portions integrally formed with respective flanges.

4. The camber setting apparatus according to claim 3, wherein the bracket comprises a channel shaped reinforcement member placed between the flanges thereof, the reinforcement member including a web portion and a pair of flange portions formed integrally with the web portion and secured to respective flanges of the bracket, the web portion contacting the lower end portion of the strut, and the flange portions of the reinforcement member including respective guide openings having substantially the same shape as the corresponding guide openings of the bracket, the adjust bolt passing through the guide openings of the reinforcement member.

5. The camber setting apparatus according to claim 4, wherein the arcuate belt portion of the bracket comprises a pair of arcuate body portions and parallel elongated belt portions, each of the arcuate body portions including corresponding one of the opposite end portions, the elongated belt portions bridging between the arcuate body portions at positions remote from respective end portions thereof.

6. The camber setting apparatus according to claim 1, wherein:

the relative angle adjusting means is arranged above the pivoting means; the relative angle adjusting means comprises a nut threaded to the adjust bolt for securing the adjust bolt to the flanges of the bracket; and the bracket comprises an arcuate belt portion mounted around the lower portion of the strut, the arcuate belt portion having opposite end portions integrally formed with respective flanges.

7. The camber setting apparatus according to claim 6, wherein the bracket comprises a channel shaped reinforcement member placed between the flanges thereof, the reinforcement member including a web portion and a pair of flange portions formed integrally with the web portion and secured to respective flanges of the bracket, the web portion contacting the lower end portion of the strut, and the flange portions of the reinforcement member including respective guide openings having substantially the same shape as the corresponding guide openings of the bracket, the adjust bolt passing through the guide openings of the reinforcement member.

8. The camber setting apparatus according to claim 7, wherein the arcuate belt portion of the bracket comprises a pair of arcuate body portions and a pair of parallel elongated belt portions, the arcuate body portions including corresponding one of the opposite end portions, the elongated belt portions bridging between the arcuate body portions at positions remote from respective end portions thereof.

* * * * *